June 27, 1967   H. W. RIMBACH   3,328,620
COPPER ACTIVATED STRONTIUM PHOSPHATE PROSPHORS
Filed May 4, 1959   3 Sheets-Sheet 1

ATOM RATIO OF ALUMINUM TO STRONTIUM

FIG. 3.

ATOM RATIO OF TOTAL METAL TO PHOSPHORUS

FIG. 4.

ATOM RATIO OF COPPER TO PHOSPHORUS

INVENTOR
HENRY W. RIMBACH.

BY  W. D. Palmer

ATTORNEY

June 27, 1967  H. W. RIMBACH  3,328,620
COPPER ACTIVATED STRONTIUM PHOSPHATE PROSPHORS
Filed May 4, 1959

INVENTOR
HENRY W. RIMBACH
BY W. D. Palmer Jr
ATTORNEY

June 27, 1967 H. W. RIMBACH 3,328,620
COPPER ACTIVATED STRONTIUM PHOSPHATE PROSPHORS
Filed May 4, 1959 3 Sheets-Sheet 3

INVENTOR
HENRY W. RIMBACH

BY W. D. Palmer

ATTORNEY

United States Patent Office 3,328,620
Patented June 27, 1967

3,328,620
COPPER ACTIVATED STRONTIUM PHOSPHATE
PHOSPHORS
Henry W. Rimbach, Cedar Grove, N.J., assignor to Westinghouse Electric Corporation, East Pittsburgh, Pa., a corporation of Pennsylvania
Filed May 4, 1959, Ser. No. 810,626
22 Claims. (Cl. 313—109)

This invention relates to phosphor material, method and discharge devices and, more particularly, to novel phosphor material, a discharge device utilizing such phosphor material and methods for making this phosphor and increasing the response of same.

Most so-called photoluminescent phosphor materials operate efficiently at relatively-low temperatures to convert ultraviolet radiations to visible radiations. At relatively high temperatures, however, the efficiency of most phosphor materials drops off rapidly. One application for phosphor materials having a good output at high temperatures (so-called good temperature-dependence characteristics) is in conjunction with high-pressure, mercury-vapor (HPMV) lamps. Such lamps are well known and are used extensively in highway lighting and in high-bay factory illumination for example. The light which is generated by the arc-tube discharge source of the lamp is concentrated primarily in the yellow and green, which when blended together produce a greenish-yellow light. While the color of this light is not displeasing, the color rendition of objects illuminated by such light is not as good as desired. It has been disclosed in U.S. Patent No. 2,748,303 to Thorington, dated May 29, 1956, to color correct an HPMV lamp by placing a phosphor material on the inner surface of the outer envelope which surrounds the arc tube. In accordance with this patent to Thorington, the phosphor material converts ultraviolet radiations generated by the arc tube into red radiations, in order to color correct the output of the lamp and improve the color rendition of objects which are illuminated by the lamp. To date the emission colors of commercially-available phosphors which have good temperature-dependence characteristics have been limited to the red and yellow-orange and in order to color correct as fully as possible the output of such HPMV lamps, it is desirable to supplement the visible output of the arc tube with blue-green radiations as well as longer wavelength radiations. It is also desirable to provide phosphor material having a good output in the blue to generally-orange region of the visible spectrum.

The best red-emitting phosphor which is currently used for color correcting HPMV lamps is manganese-activated magnesium fluorogermanate, as disclosed by Thorington in his patent. This phosphor is relatively expensive and has a slightly-yellow body of color, resulting in some absorption of the visible radiations which are produced by the arc tube. It would be desirable to use less of the manganese-activated magnesium fluorogermanate phosphor to produce a color-corrected lamp.

It is the general object of this invention to avoid and overcome the foregoing and other difficulties of and objections to prior-art practices by the provision of phosphor material having good temperature-dependence characteristics and a blue to orange response.

It is an additional object to provide blue- to orange-emitting phosphor for use with any type of discharge device and methods for making such phosphor and improving the output of same.

It is a further object to provide a color-corrected, high-pressure, mercury-vapor lamp utilizing a composite phosphor material wherein blue and green radiations are emitted by the composite phosphor to supplement and color correct the output of the lamp arc tube, while simultaneously maintaining the red radiations emitted by the lamp at a high level.

The aforesaid objects of the invention, and other objects which will become apparent as the description proceeds, are achieved by providing phosphate phosphor material and a method for making same. In a first class of phosphor embodiments, the phosphate phosphor material includes as metallic elements strontium, copper activator and one or more of aluminum, gallium and indium. In a second class of phosphor embodiments, the phosphate phosphor material includes as metallic elements strontium, copper activator and either magnesium or calcium. Permissible, preferred and optimum concentrations are provided for the ratio of total metal to phosphorus, the ratio of aluminum, gallium or indium to strontium, the ratio of calcium or magnesium to strontium and the ratio of copper to phosphorus in the phosphor. Also provided are a method for increasing the output of the foregoing phosphor and a high-pressure, mercury-vapor lamp which utilizes the present phosphor in conjunction with an already-known, red-emitting phosphor.

For a better understanding of the invention, reference should be had to the accompanying drawings wherein.

While phosphor material of this invention has particular utility with respect to high-pressure, mercury-vapor lamps and is so described herein, it should be understood that the phosphor material may also be used for any application where it is desired to convert ultraviolet radiations to visible radiations, such as a standard fluorescent lamp.

Figure 1:
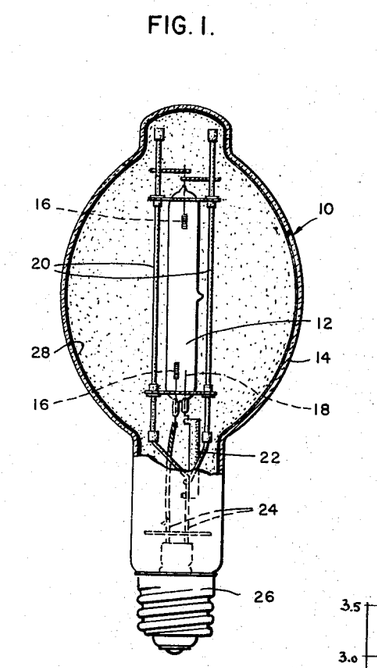
FIG. 1 is an elevational view, partly in section, of a high-pressure, mercury vapor lamp which incorporates the phosphor of this invention.

With specific reference to the form of the invention as shown in the drawings, the numeral 10 in FIG. 1 illustrates generally a high-pressure, mercury-vapor lamp comprising an inner arc tube 12 which is surrounded by a vitreous, light-transmitting outer envelope 14. The construction of the inner arc tube 12, which may be fabricated of quartz for example, is well known and includes main electrodes 16 operatively disposed at either end thereof with a starting electrode 18 positioned proximate one of the main electrodes 16. The inner arc tube 12 is suitably supported within the outer envelope 14 by a conventional supporting frame 20 and a starting resistor 22 is used to connect the starting electrode 18 to one side of the energizing potential, as is usual. Energizing potential is supplied to the electrodes 16 of the power-operable arc tube 12 through conventional lead conductors 24, which in turn electrically connect to a conventional screw-type base 26. The inner surface of envelope 14 carries a coating 28 of phosphor, which phosphor will be described in detail hereinafter.

The phosphor of this invention is a phosphate type and can be categorized in two general classes of embodiments. The first class of phosphor embodiments includes as metallic elements strontium, copper activator and one or more of aluminum, gallium and indium. The curves presented in FIGS. 2 through 6 illustrate the effects of compositional variations on brightness for this first class of phosphor embodiments, in addition to the performance characteristics for the phosphor. Aluminum is preferred over gallium and indium for applications where the phosphor is operated at relatively-high temperatures and the curves as presented in FIGS. 2 through 4 were taken for a copper-activated strontium-aluminum phosphate maintained at a temperature of 275° C. and excited with a HPMV arc through a Corning No. 7–54 filter. Brightness was measured with an eye-sensitive photocell. If gallium or indium or mixtures thereof are substituted either in part or in whole for the aluminum constituent of the phosphor, the permissible, preferred and optimum proportions of constituents which comprise the phosphor remain the same.

Figure 2:
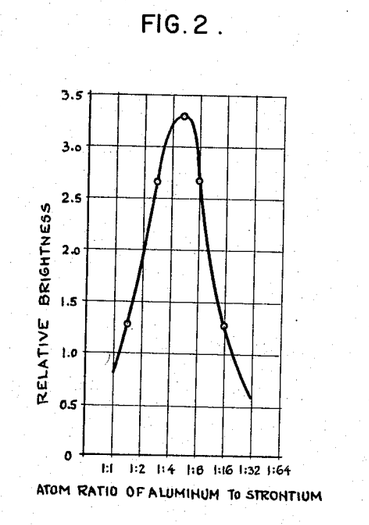
FIG. 2 is a graph of relative brightness versus the ratio of atoms of aluminum to atoms of strontium in the phosphor.

In FIG. 2 is shown a graph of relative brightness versus the atom ratio of aluminum to strontium with the atom or gram-atom ratio of copper to phosphorus maintained at 0.015:2. A room-temperature curve similar in shape to that shown in FIG. 2 would be obtained if indium or gallium or mixtures thereof were substituted either in part or in whole for the aluminum. Permissibly the ratio of atoms of aluminum to atoms of strontium is from 1:1.5 to 1:16 and preferably the atom ratio of aluminum to strontium is from 1:3 to 1:8. Maxium brightness is obtained when the atom ratio of aluminum to strontium is about 1:5.5. The aluminum, gallium, indium or mixtures thereof which are incorporated into the phosphor appear to act in an amphoteric fashion, that is, they act as both an acid and a base. This tendency is especially manifested when relatively-large amounts of these materials are used and the greater the proportion of aluminum, for example, with respect to strontium, the greater the atom ratio of total metal to phosphorus required for best output. In taking the curve as shown in FIG. 2, the atom ratio of total metal to phosphorus was adjusted according to the atom ratio of aluminum to strontium to obtain maximum brightness. When the atom ratio of aluminum to strontium is 1:1.5, maximum brightness occurs with an atom ratio of total metal to phosphorus of about 4.0:2. When the atom ratio of aluminum to strontium is 1:16, however, maximum brightness occurs with an atom ratio of total metal to phosphorus of about 2.9:2. Because of the amphoteric nature of the aluminum, gallium and indium, it is necessary that when the atom ratio of these metals to strontium is less than about 1:3, the atom ratio of total metal to phosphorus should be less than about 3.4:2. For better response as when the atom ratio of aluminum to strontium is from 1:3 to 1:8, the atom ratio of total metal to phosphorus is preferably from 2.9:2 to 3.3:2.

Figure 3:
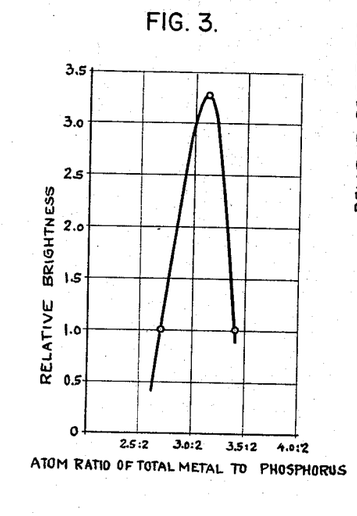
FIG. 3 is a graph of relative brightness versus the ratio of atoms of total metal to atoms of phosphorus for the aluminum-including embodiment of the phosphor.

In FIG. 3 is shown the effect on brightness with respect to varying the ratio of atoms or gram atoms of total metal to phosphorus in the present phosphor with the atom ratio of aluminum to strontium and the atom ratio of copper to phosphorus maintained at about optimum. When the atom ratio of aluminum to strontium in the phosphor is approximately optimum, the permissible range for the atom ratio of total metal to phosphorus is from 2.7:2 to 3.4:2 and for optimum performance this atom ratio is slightly greater than 3.0:2, that is about 3.1:2.

Figure 4:
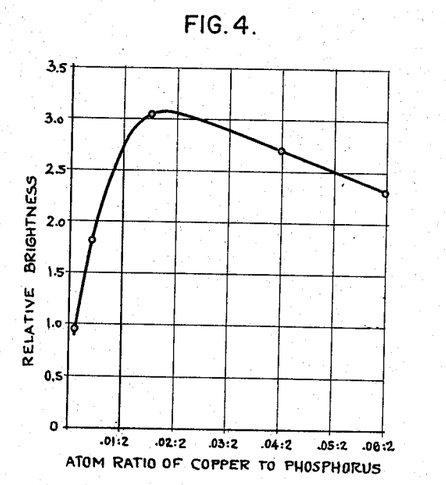
FIG. 4 is a graph of relative brightness versus the ratio of atoms of copper to atoms of phosphorus for the aluminum-including phosphor embodiment.

In FIG. 4 is shown the effect of variations in copper concentration on relative brightness, wherein relative brightness is plotted versus the atom ratio of copper to phosphorus. In taking this curve, the atom ratio of aluminum to strontium and the atom ratio of total metal to phosphorus were maintained at about optimum. The copper when used in higher concentrations introduces some tendency for discoloration. This is objectionable as it is indicative of absorption characteristics in the visible region of the spectrum and it is desirable to stay toward the lower end of the copper ranges, commensurate with good brightness. Permissibly the atom ratio of copper to phosphorus is from 0.001:2 to 0.06:2. Preferably this ratio is from 0.004:2 to 0.04:2 and the optimum ratio of copper to phosphorus is about 0.015:2.

Summarizing the foregoing, the first class of phosphor embodiments are phosphate phosphors which include as metallic elements strontium, copper activator and one or more of aluminum, gallium and indium. The ratio of atoms of total aluminum, gallium and indium to atoms of strontium permissibly is from 1:1.5 to 1:16, preferably is from 1:3 to 1:8 and for optimum performance is about 1:5.5. The ratio of atoms of copper to atoms of phosphorus permissibly is from 0.001:2 to 0.06:2, preferably is from 0.004:2 to 0.04:2 and for optimum performance is about 0.015:2. The ratio of atoms of total metal to atoms of phosphorus in the phosphor permissibly is from 2.7:2 to 4.0:2 and because of the amphoteric nature of the aluminum, gallium or indium, when the atom ratio of these metals to strontium is less than about 1:3, the atom ratio of total metal to phosphorus should be less than about 3.4:2. For better output as when the atom ratio of aluminum, gallium or indium is from 1:3 to 1:8, the atom ratio of total metal to phosphorus should be from 2.9:2 to 3.3:2. For best results, when the atom ratio of aluminum, gallium or indium to strontium is optimum, the atom ratio of total metal to phosphorus should be about 3.1:2.

The first class of phosphor embodiments can also be represented by formula as follows:

$$wSrO \cdot y(X_2O_3/2) \cdot P_2O_5 : zCu$$

where X is aluminum, gallium, indium or mixtures thereof and $w+y+z$ represent atoms or gram atoms of tonal metal. The values for $w$, $y$ and $z$ as given hereinbefore can be substituted into this formula.

Following are examples for producing the first class of phosphor embodiment in accordance with this invention.

*Example I*

| Raw-mix constituent: | Amount grams |
|---|---|
| $SrHPO_4$ (38.6% $P_2O_5$-56% SrO) | 367.6 |
| $SrCO_3$ | 93.8 |
| $Al(OH)_3$ having 64.8% $Al_2O_3$ | 37.52 |
| Copper carbonate (56% Cu) | 1.99 |

The foregoing raw-mix constituents are thoroughly mixed and are fired at a temperature of 1160° C. for about one-half hour. The firing temperature can be varied and is not critical, although temperatures appreciably higher than the indicated temperature, such as 1200° C., will result in an excessively-hard phosphor and temperatures appreciably lower than indicated, such as 1100° C., will result in a phosphor which has relatively-low brightness. The phosphor firing atmosphere desirably is at most mildly reactive in that it desirably is either slightly reducing, inert or slightly oxidizing in nature. The brightest phosphors are obtained with a slightly-reducing firing atmosphere which comprises an inert gas having added thereto some hydrogen and a small amount of moisture. The phosphor desirably is cooled in a similar atmosphere. As an example, the firing atmosphere has a dew-point of 22° C. and comprises nitrogen with from 1% to 10% and preferably from 2% to 4% of hydrogen. The moisture can be varied considerably and other inert gases can be substituted for the nitrogen. However, good phosphors can be obtained with a firing atmosphere which consists of an inert gas containing a small amount of moisture, a firing atmosphere consisting of a dry inert gas or a firing atmosphere consisting of a dry inert gas and a small amount of hydrogen. While the hydrogen in the foregoing quantities is slightly reducing in nature, the moisture supplies a slightly-oxidizing effect to the atmosphere. If the phosphor raw mix is fired in air, the resulting phosphor is not nearly as bright as where the raw mix is fired in the atmosphere which is at most mildly reactive and preferably slightly reducing. In view of this, it is probable that the effect of the firing atmosphere which is at most mildly reactive is to cause at least a part of the copper to be in the cuprous state. The emission color of the strontium-aluminum phosphate phosphor is green-blue-green. The temperature-dependence characteristics of this phosphor are very good.

*Example II*

Raw-mix constituent: Amount grams
$SrHPO_4$ ______________________________ 2.20
$SrCO_3$ _______________________________ 0.592
$In_2O_3$ _______________________________ 0.368
Copper carbonate (56% Cu) __________ 0.010

The foregoing raw-mix constituents are fired at a temperature of approximately 1200° C. for about one-half hour with the firing and processing conditions otherwise being the same as indicated under Example I. The emission color of the resultant strontium-indium phosphate phosphor is more green than the color of the strontium-aluminum phosphate phosphor, although the temperature-dependence characteristics are not as good.

*Example III*

Raw-mix constituent: Amount grams
$SrHPO_4$ ______________________________ 2.20
$SrCO_3$ _______________________________ 0.592
$Ga_2O_3$ ______________________________ 0.248
Copper carbonate (56% Cu) __________ 0.01

The foregoing raw-mix constituents are well mixed and are fired at a temperature of approximately 1160° C. for about one-half hour. The firing atmosphere and other firing and processing conditions are the same as indicated hereinbefore under Example I. The firing temperature is subject to considerable variation although at a firing temperature of about 1200° C., there is some tendency for the phosphor to become excessively hard and at a firing temperature of about 1100° C. the phosphor brightness suffers somewhat. In preparing the foregoing phosphors, the first-fired phosphor can be milled and refired if desired. The emission color of the strontium-gallium phosphate is similar to the indium-including embodiment although the temperature-dependence characteristics are not as good.

In any of the foregoing examples, small amounts of other alkaline-earth materials may be substituted for a small portion of the strontium without materially affecting the performance of the phosphor. In addition, the aluminum, gallium or indium or any mixtures thereof can be substituted for one another. As an example, equal molar proportions of any of these metals as the oxides can be substituted for the aluminum hydroxide in Example I, selecting the atom ratio of total substituent to strontium in accordance with the curve as shown in FIG. 2. The resultant phosphor will have emission and other performance characteristics which are intermediate the extremes which are realized when aluminum, gallium or indium are used singly.

The brightness of the foregoing first class of phosphor embodiments can be improved somewhat by washing the prepared phosphor in an ammonium chloride solution. As an example, 5 grams of finely-divided strontium-aluminum phosphate as prepared in accordance with Example I can be mixed with 1 gram of ammonium chloride and 5 cc. water. This mixture is then agitated, diluted to 100 cc. and the phosphor allowed to settle. Thereafter the supernatant liquid is decanted and the residual phosphor is rinsed until substantially all the ammonium chloride is removed. Normally about four rinses will remove substantially all of the ammonium chloride. This apparently removes any excess copper. In the foregoing example, the concentration of phosphor to ammonium chloride solution is not critical and can be varied considerably. This indicated wash has been found to increase the brightness of the phosphor by approximately 10%.

Figure 5:
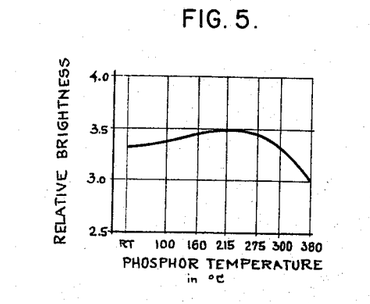
FIG. 5 is a graph of relative brightness versus temperature for the aluminum-including phosphor embodiment.

In FIG. 5 is shown a curve of relative brightness versus phosphor temperature in degree centigrade for the strontium-aluminum phosphate phosphor. As shown, the brightness of the phosphor increases with increasing temperature. When a temperature of 275° C. is exceeded, the brightness of the phosphor decreases somewhat. These excellent temperature-dependence characteristics make this phosphor particularly suitable for use in conjunction with HPMV lamps such as illustrated in FIG. 1.

Figure 6:
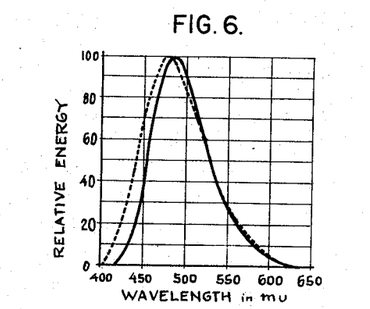
FIG. 6 illustrates curves of relative energy versus wavelength, taken at two different temperatures for the aluminum-including phosphor embodiment.

In FIG. 6 are shown curves of relative energy versus wavelength taken at two different temperatures for the foregoing strontium-aluminum phosphate phosphor. Phosphor excitation was an HPMV arc through a Corning No. 7–54 filter. The phosphor has excellent response to the 2537 A.U. mercury-resonant radiations and its response to longer wavelength ultraviolet radiations is reasonably good. The curve shown in solid line was taken at room temperature and the curve shown in dashed line was taken at a temperature of 275° C. and both of these curves are normalized to 100%. At higher temperatures of operation, the overall emission of the phosphor shifts slightly toward the shorter wavelengths and its appearance to the eye shifts from green-blue-green to a blue-green. The quantum efficiency of the phosphor increases approximately 30% as it is heated from room temperature to 275° C.

Figure 7:
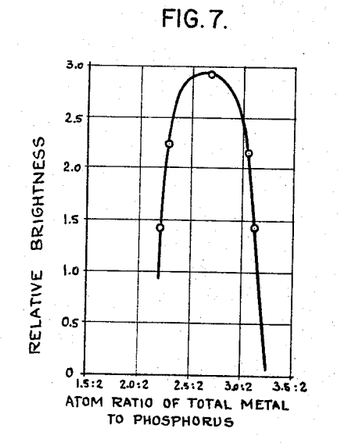
FIG. 7 is a graph of relative brightness versus the ratio of atoms of total metal to atoms of phosphorus for the calcium-including phosphor embodiment.

The second class of phosphor embodiments includes as metallic elements strontium, copper activator and either calcium or magnesium. The curves as shown in FIGS. 7 through 15 illustrate the effects on compositional variations for this second class of phosphor embodiments, in addition to performance characteristics for the phosphor. The phosphor excitation used in taking the curves in FIGS. 7–13 was an HPMV arc through a Corning No. 7–54 filter and brightness was measured with an eye-sensitive photocell. In FIG. 7 is shown a graph of relative brightness versus the ratio of atoms of total metal to atoms of phosphorus in the phosphor, with the atom ratio of calcium to strontium maintained at 1:8 and the atom ratio of copper to phosphorus maintained at 0.015:2. Permissibly the ratio of atoms of total metal to atoms of phosphorus is from 2.2:2 to 3.1:2 and preferably this ratio is from 2.3:2 to 3.05:2. For optimum performance, the atom ratio of total metal to phosphorus should be about 2.7:2. For atom ratios of total metal to phosphorus which approach this optimum value of 2.7:2, the brightness of the resulting phosphor will vary only slightly. Chemically the calcium included in the phosphor acts as a dipositive metal and as shown in FIG. 7, it is desired to have a slight excess of $P_2O_5$ over tertiary orthophosphoric proportions.

Figure 8:
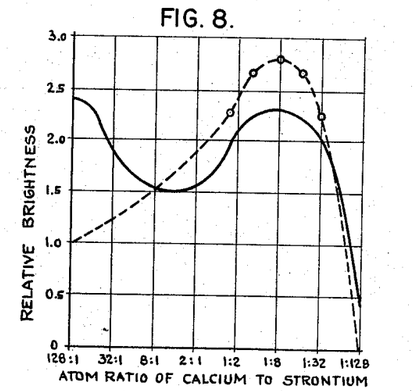
FIG. 8 illustrates curves, taken at two different temperatures, of relative brightness versus the ratio of atoms of calcium to atoms of strontium in the phosphor.

In FIG. 8 is shown the effect on brightness with respect to varying the atom ratio of calcium to strontium in the phosphor. In obtaining the curves as shown in FIG. 8, the atom ratio of total metal to phosphorus was maintained at about optimum and the atom ratio of copper to phosphorus was maintained at 0.015:2. The solid line in FIG. 8 represents the phosphor brightness at room temperature and the dashed line in FIG. 8 represents the phosphor brightness at a temperature of approximately 275° C., which is representative of the phosphor operating temperature encountered in conjunction with an HPMV lamp. The permissible ratio of atoms of calcium to atoms of strontium in the phosphor is from 1:1.5 to 1:32 and the preferred atom ratio of calcium to strontium is from 1:3 to 1:20. Best output is obtained when the atom ratio of calcium to strontium is about 1:8. The curves as shown in FIG. 8 are particularly interesting in that at room temperature, a calcium-strontium phosphate phosphor with an atom ratio of Ca:Sr of 128:1 has a reasonably good brightness. With increasing amounts of strontium with respect to calcium, the room-temperature brightness drops. When the atom ratio of calcium to strontium is appreciably less than 1:1, however, the room-temperature brightness increases. At elevated temperatures, in contrast, a phosphor which is predominately calcium phosphate has a poor output, as shown in the dashed curve in FIG. 8, and good brightness is not obtained until a predominance of strontium is utilized. It is also interesting to note that a strontium phosphate per se is essentially non-fluorescent while a calcium phosphate per se has a comparatively-good brightness at room temperature.

Figure 9:
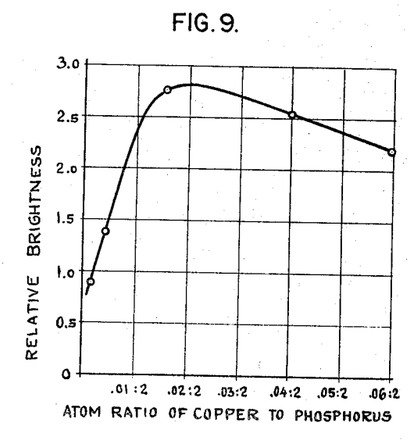
FIG. 9 is a graph of relative brightness versus the ratio of atoms of copper to atoms of phosphorus for the calcium-including phosphor embodiment.

In FIG. 9 is shown the effect of varying the amount of copper in the strontium-calcium phosphor. In taking the curve shown in FIG. 9, the atom ratios of total metal to phosphorus and calcium to strontium were maintained at about optimum. The ratio of atoms of copper to atoms of phosphorus permissibly is from 0.001:2 to 0.06:2 and preferably the atom ratio of copper to phosphorus is from 0.004:2 to 0.04:2. For best results, the atom ratio of copper to phosphorus should be about 0.015:2. At the lower end of the indicated copper ranges, the brightness of the phosphor is somewhat decreased. Such a phosphor when activated by relatively-small amounts of copper is quite useful when incorporated into lamps, however, since relatively-high copper concentrations tend to introduce a slight body color to the phosphor, thereby cutting down somewhat on the total light emitted by the lamp. For this reason, it is desirable to stay toward the lower end of the indicated copper ranges, commensurate with good phosphor brightness.

Figure 10:
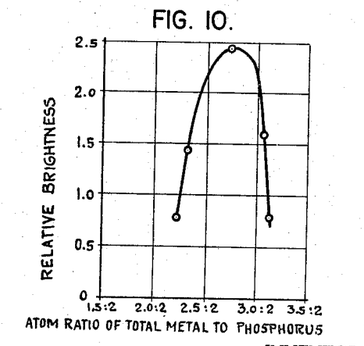
FIG. 10 is a graph of relative brightness versus the ratio of atoms of total metal to atoms of phosphorus for the magnesium-including phosphor embodiment.

In FIG. 10 is shown a graph of relative brightness versus the ratio of atoms of total metal to atoms of phosphorus for the magnesium-including embodiment of the phosphor. The atom ratio of magnesium to strontium permissibly is from 2.2:2 to 3.1:2 and preferably the atom ratio of total metal to phosphorus is from 2.3:2 to 3.05:2. For optimum performance, the atom ratio of total metal to phosphorus should be about 2.7:2. For atom ratios of total metal to phosphorus which approach optimum value of about 2.7:2, the brightness of the resulting phosphor will vary only slightly. Chemically the magnesium which is included in the phosphor acts as a dipositive metal and as shown in FIG. 10, a slight excess of $P_2O_5$ with respect to total metal over tertiary orthophosphoric proportions is desired for best performance.

Figure 11:
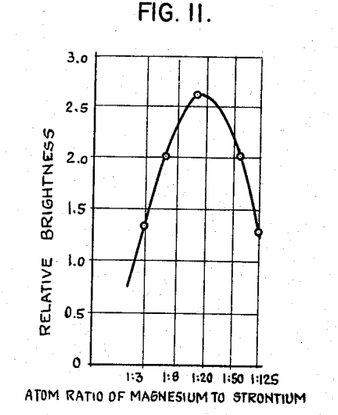
FIG. 11 is a graph of relative brightness versus the ratio of atoms of magnesium to atoms of strontium in the phosphor.

In FIG. 11 is shown the effect on brightness with respect to varying the ratio of atoms of magnesium to atoms of strontium in the phosphor. In taking the curves as presented in FIG. 11, the atom ratio of total metal to phosphorus and the atom ratio of copper to phosphorus were maintained at about optimum. The atom ratio of magnesium to strontium in the phosphor permissibly is from 1:3 to 1:125 and preferably the atom ratio of magnesium to strontium is from 1:6 to 1:60. For optimum performance, the atom ratio of magnesium to strontium is about 1:13. For ratios of magnesium to strontium approaching the optimum value of 1:13, the brightness of the resulting phosphor will vary only slightly. The curve as shown in FIG. 11 is to be contrasted with the curve as shown in FIG. 8 in that increasing amounts of magnesium with respect to strontium cause the phosphor brightness to drop off very rapidly after the optimum ratio is appreciably exceeded, whereas in the calcium-including embodiment of the phosphor, the brightness does not drop off as rapidly with an increasing ratio of calcium to strontium after the optimum is appreciably exceeded.

Figure 12:
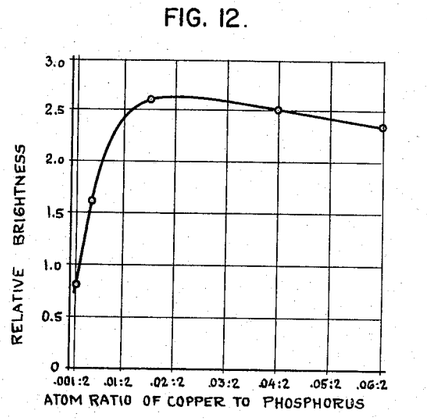
FIG. 12 is a graph of relative brightness versus the ratio of atoms of copper to atoms of phosphorus for the magnesium-including phosphor embodiment.

In FIG. 12 is shown the effect of varying the copper content in the phosphor embodiment which incorporates magnesium. In taking the curve as shown in FIG. 12, the atom ratio of total metal to phosphorus and the atom ratio of magnesium to strontium were maintained at about optimum. The ratio of atoms of copper to atoms of phosphorus in the phosphor permissibly is from 0.001:2 to 0.06:2 and preferably the atom ratio of copper to phosphorus is from 0.004:2 to 0.04:2. For best results, the atom ratio of copper to phosphorus is about 0.015:2. As with the phosphor embodiment which incorporates calcium instead of magnesium, at the lower end of the indicated copper ranges, the brightness of the phosphor is decreased somewhat although such phosphor which incorporates relatively-small amounts of copper activator is quite useful since relatively-high copper-activator concentrations tend to introduce a slight body color in the phosphor. As indicated hereinbefore, it is desirable to stay toward the lower end of the indicated copper ranges, balancing brightness against body color. Summarizing the second class of phosphor embodiments, there are phosphate phosphors which include as metallic elements strontium, copper activator and calcium or magnesium. The ratio of atoms of total metal to atoms of phosphorus in the phosphor is permissibly from 2.2:2 to 3.1:2, preferably from 2.3:2 to 3.05:2 and for optimum performance is about 2.7:2. The ratio of atoms of calcium to atoms of strontium in the phosphor is permissibly from 1:1.5 to 1:32, preferably is from 1:3 to 1:20 and for optimum performance is about 1:8. The ratio of atoms of magnesium to atoms of strontium in the phosphor is permissibly from 1:3 to 1:125, preferably from 1:6 to 1:60 and for optimum performance is about 1:13. The ratio of atoms of copper to atoms of phosphorus in the phosphor permissibly is from 0.001:2 to 0.06:2, preferably is from 0.004:2 to 0.04:2 and for optimum performance is about 0.015:2. This class of phosphor embodiments can also be represented by formula as follows:

$$wSrO \cdot xCaO \cdot yMgO \cdot P_2O_5 {:} zCu$$

where either $x$ or $y$ is zero depending on whether the calcium- or magnesium-including embodiment is represented and $w+z+(x \text{ or } y)$ express atoms of total metal. The values for $w$, $x$, $y$ and $z$ as given hereinbefore can be substituted into this formula.

Following are examples for producing phosphor material of the second class of embodiments, in accordance with this invention.

*Example IV*

| Raw-mix constituent: | Amount, grams |
|---|---|
| $SrHPO_4$ (38.6% $P_2O_5$-56% SrO) | 367.6 |
| $SrCO_3$ | 60.95 |
| $CaCO_3$ | 30.0 |
| Copper carbonate (56% Cu) | 1.70 |

The foregoing raw-mix constituents are thoroughly mixed and are fired at a temperature of about 1300° C. for about one-half hour. The firing temperature can be varied and is not critical, although temperatures appreciably higher than the indicated firing temperature, such as 1350° C., will result in a phosphor which is somewhat hard to reduce to a finely-divided status suitable for coating. Temperatures appreciably lower than the indicated firing temperatures, such as 1200° C., will result in a phosphor which has a somewhat lower brightness. The phosphor firing atmosphere desirably is at most mildly reactive in that it desirably is either slightly reducing, inert or slightly oxidizing in nature. The brightest phosphors are obtained with a slightly-reducing firing atmosphere which comprises an inert gas having added thereto some hydrogen and a small amount of moisture. The phosphor desirably is cooled in a similar atmosphere. As an example, the firing atmosphere has a dew-point of 22° C. and comprises nitrogen with from 1% to 10% and preferably from 2% to 4% of hydrogen. The moisture can be varied considerably and other inert gases can be substituted for the nitrogen. However, good phosphors can be obtained with a firing atmosphere which consists of an inert gas containing a small amount of moisture, a firing atmosphere consisting of a dry inert gas or a firing atmosphere consisting of a dry inert gas and a small amount of hydrogen. While the hydrogen in the foregoing quantities is slightly reducing in nature, the moisture supplies a slightly-oxidizing effect to the atmosphere. If the phosphor raw mix is fired in air, the resulting phosphor is not nearly as bright as where the raw mix is fired in the atmosphere which is at most widely reactive and preferably slightly reducing. In view of this, it is probable that the effect of the firing atmosphere which is at most mildly reactive is to cause at least a part of the copper to be in the cuprous state.

*Example V*

| Raw-mix constituent: | Amount, grams |
|---|---|
| SrHPO$_4$ | 367.6 |
| SrCO$_3$ | 84.55 |
| MgO | 8.14 |
| Copper carbonate (56% Cu) | 1.70 |

The foregoing raw-mix constituents are fired at a temperature of approximately 1250° C. for about one-half hour with the firing and processing conditions otherwise being the same as indicated under Example IV. If the firing temperature is decreased appreciably, such as to 1150° C., the phosphor brightness will suffer and if the firing temperature is increased appreciably, such as to 1300° C., the phosphor will become excessively hard. With respect to the reducing condition of the firing atmosphere and the desired amount of moisture, these can be maintained as in the foregoing Example IV. Any of the foregoing phosphors can be milled and refired if desired. In any of the phosphor embodiments as prepared in accordance with Examples I through V hereinbefore, the phosphor raw mix can be prefired in air and thereafter fired in the atmosphere as specified.

In either of Examples IV and V, small amounts of other alkaline-earth materials may be substituted for a small portion of the strontium without materially affecting the performance of the phosphor. In addition, the magnesium and calcium can be mixed if desired and the resultant prosphors will have emission and other performance characteristics which are intermediate the extremes which are realized when the magnesium or calcium are used singly.

The brightness of the calcium- and magnesium-including phosphor can be improved slightly by washing same in an ammonium chloride solution after firing and cooling. As an example, 5 grams of finely-divided strontium-magnesium or strontium-calcium phosphate as prepared in accordance with Examples IV or V can be mixed with one gram of ammonium chloride and 5 cc. water. This admixture is then agitated, diluted to 100 cc. and allowed to settle. Thereafter the supernatant liquid is decanted and the residual phosphor is rinsed until substantially all of the ammonium chloride is removed. Normally about 4 washes will remove substantially all of the ammonium chloride. Apparently the effect of this wash is to remove any excess copper. In the foregoing example, the concentration of phosphor to ammonium chloride solution is not critical and can be varied considerably. This indicated wash has been found to increase the brightness of the phosphor by approximately 10%.

Figure 13:
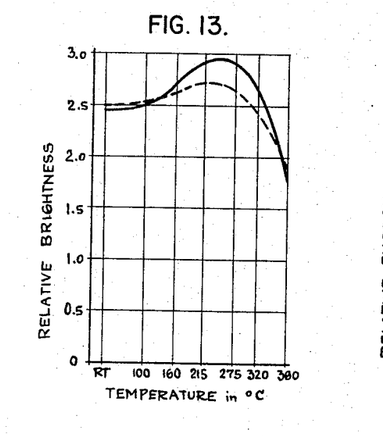
FIG. 13 is a graph of relative brightness versus temperature, illustrating temperature-dependence characteristics for the strontium-including and magnesium-including phosphor of this invention.

In FIG. 13 are shown curves of relative brightness versus phosphor temperature in degrees centigrade for the strontium-calcium phosphate phosphor, shown as a solid line, and the strontium-magnesium phosphate phosphor, shown as a dashed line. As illustrated in these curves, the brightness of both of the phosphors increases until a temperature of about 260° C. is achieved, after which the brightness of the phosphors decreases. These excellent temperature-dependence characteristics make either of these phosphors particularly suitable for use in conjunction with HPMV lamps such as illustrated in FIG. 1. The decrease brightness of the strontium-magnesium phosphate as compared to the strontium-calcium phosphate is due in part to the fact that the phosphor has a relatively-blue emission as compared to the relatively-green emission of the strontium-calcium phosphate.

Figure 14:
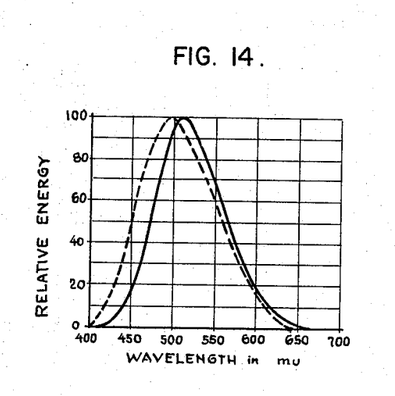
FIG. 14 is a graph of relative energy versus wavelength taken at two different temperatures for the calcium-including phosphor embodiment.
Figure 15:
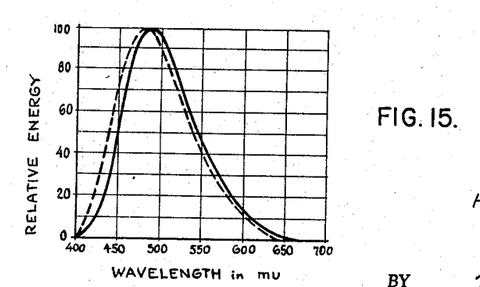
FIG. 15 is a graph of relative energy versus wavelength taken at two different temperatures for the magnesium-including phosphor embodiment.

In FIG. 14 are shown curves of relative energy versus wavelength taken at two different temperatures for the strontium-calicum phosphate phosphor and similar curves are shown in FIG. 15 for the strontium-magnesium phosphate phosphor. Phosphor excitation was an HPMV arc through a Corning No. 7–54 filter. Both of these phosphors have excellent response to the 2537 A.U. mercury-resonant radiations and their response to longer wavelength ultra-violet radiations is also reasonably good. The curves which are shown in solid lines were taken for these phosphors at room temperature and the curves shown in dashed lines were taken for these phosphors at a temperature of 275° C. All of the curves are normalized to 100%. As shown, at higher temperatures of operation the peak of emission for both of these phosphors shifts slightly toward the shorter wavelengths and the appearance to the eye shifts from a green to a green-blue-green for the strontium-calcium phosphate and from a blue-blue-green to a generally-blue for the strontium-magnesium phosphate.

Other activator material can be used to supplement the copper activator in any of the foregoing phosphor embodiments. The best additional activator or coactivator is manganese and it can be used in such amount that the atom ratio of manganese to phosphorus is from 0.001:2 to 0.20:2. The manganese can be added to the raw mix as the carbonate for example. The manganese coactivator introduces a red-orange band and suppresses somewhat the shorter wavelength emission of the phosphor. The greater the amount of manganese coactivator used, the stronger the red-orange band and the more suppressed the shorter wavelength band emitted by the phosphor. Relatively-large amounts of additional activator in the phosphor causes the appearance of the phosphor emission to the eye to be generally orange. The red-orange band introduced by the manganese displays considerable phosphorescence or afterglow, contrary to the shorter wavelength band introduced by the copper activator. Other activators such as tin can be used in place of the manganese to supplement the copper activator although manganese is preferred. The tin additional activator also introduces a longer wavelength band. The tin additional activator can be added to the raw mix as the oxide for example and can be used in the same atom proportion with respect to phosphorus as the manganese coactivator. Alternatively, tin and manganese additional activators can be used together in any proportions, provided the atom ratio of total additional activator to phosphorus is from 0.001:2 to 0.20:2.

The emission spectra of the strontium-aluminum, the strontium-calcium and the strontium-magnesium phosphate phosphors coupled with the excellent temperature-dependence characteristics of these phosphors make them particularly suitable for use in conjunction with HPMV lamps, such as illustrated in FIG. 1. As noted hereinbefore, the light which is generated by the arc-tube discharge source of such a lamp is concentrated primarily in the yellow and the green and this light is deficient in both the blue-green and the red region of the visible spectrum. These phosphors when used singly with an HPMV lamp or when blended produce new color effects. In addition, any of this phosphor can be mixed with manganese-activated magnesium fluorogermanate such as described in the aforementioned patent to Thorington to produce very unusual results in that the shorter wavelength blue radiations which are generated by the foregoing phosphor are converted by the fluorogermanate into red radiations. This is in addition to the ultraviolet radiations which excite the fluorogermanate. By increasing the range of wavelengths which are used to excite the fluorogermanate phosphor, it can be made to generate red radiations with more efficiency. This is particularly desirable since the fluorogermanate phosphor is quite expensive and in addition, has a somewhat yellow body color, which tends to absorb visible radiations generated by the arc tube discharge source. By using less of the fluorogermanate phosphor, less visible radiations as generated by the arc discharge source are absorbed. Those visible radiations which are not converted by the fluorogermanate phosphor into red radiations, such as the longer wave length blue and green radiations generated by the phosphor, add blue and green radiations to the output of the HPMV lamp in order to supplement the light output thereof to improve further the color correction. In addition, the total light output of the lamp is augmented. It has been found that the foregoing indicated phosphor when admixed with the fluorogermanate should comprise at least 30% by weight of the fluorogermanate and there should be present at least 10% by weight of the fluorogermanate in order to provide sufficient red radiations for adequate color correction. As a specific example, an HPMV lamp incorporating a blend comprising 35% by weight manganese-activated magnesium fluorogermanate phosphor and 65% by weight of the foregoing strontium-aluminum phosphate phosphor had 9% of its total visible output in the red region of the visible spectrum, that is from 6,000 to 7,000 A.U. A similar control lamp coated with a like amount of manganese-activated magnesium fluorogermanate per se had only 11% of its total visible output in the red region of the visible spectrum. Thus with approximately ⅓ of the fluorogermanate phosphor, almost as much red radiations were produced by the phosphor mixture as were produced by the lamp which was coated with the fluorogermanate per se. In addition, the lamp coated with the composite phosphor displayed a better color-corrected output in that normally-deficient blue and blue-green radiations were provided by the strontium-aluminum phosphate phosphor.

As an alternative embodiment, the present strontium-calcium and strontium-aluminum phosphate phosphor can be mixed in any proportions and blended with at least 10% by weight of the fluorogermanate to achieve improved effects. The present phosphor as mixed should comprise at least 30% by weight of the blend. As a specific example, 30% by weight of the present strontium-aluminum phosphate phosphor, 30% by weight of the present strontium-calcium phosphate phosphor and 40% by weight of manganese-activated magnesium fluorogermanate can be blended for use as a color-correcting phosphor for an HPMV lamp. Such a blend has several advantages in that considerable shorter wavelength radiations are emitted by the strontium-aluminum phosphate phosphor, which serve to excite the fluorogermanate. The strontium-calcium phosphate phosphor emits some of these shorter wavelength radiations, although to a lesser degree. This strontium-calcium phosphate phosphor also emits considerable green radiations, which serve to increase the overall output of the lamp. Thus with such a blend, the magnesium fluorogermanate is made to operate more efficiently, missing blue-green radiations are supplied to the overall output of the lamp and additional green radiations are supplied to increase still further the total visible output of the lamp.

In the usual case, the present phosphate phosphor and fluorogermanate will be mixed with one another within the foregoing indicated proportions. These phosphors may be individually applied in separate layers if desired. As an example, the fluorogermanate phosphor can be coated as a very thin layer adjacent the inner surface of the outer envelope and the present strontium-aluminum phosphate phosphor coated thereover. With such a plural layer coating, the shorter wavelength blue radiations which are generated by the strontium-aluminum phosphate phosphor, for example, act more effectively to excite the fluorogermanate phosphor to produce desired red radiations.

The present phosphor is somewhat unusual in that it tends to lose output when heated to intermediate temperatures such as 650° C. This is important since the lamp-lehring temperatures required to remove the customarily-used binder material from coated phosphor tend to impair the phosphor output. This difficulty is readily overcome by limiting the temperatures to which the prepared phosphor is exposed to about 550° C. or less. The phosphor can be coated onto an envelope with an electrostatic process or with a boric acid binder, which binder material can be rendered effective to bond the phosphor to the lamp envelope at relatively-low lehring temperatures so that the phosphor output is not impaired.

It will be recognized that the objects of the invention have been achieved by providing phosphor material having a blue to orange response and by providing phosphor material having good temperature-dependence characteristics. Methods for making this phosphor and improving the output of same have also been provided. In addition, there has been provided a color-corrected, high-pressure, mercury-vapor lamp utilizing composite phosphor material wherein blue and green radiations are emitted by the composite phosphor material to supplement and color correct the output of the lamp arc tube, while simultaneously maintaining at a high level the red radiations emitted by the lamp.

While best-known embodiments have been illustrated and described in detail, it is to be particularly understood that the invention is not limited thereto or thereby.

I claim:
1. A phosphate phosphor having as essential metallic elements strontium, copper at least a portion of which is in the cuprous state, and at least one of the group consisting of aluminum, gallium and indium, a ratio of atoms of total metal to atoms of phosphorus in said phosphor of from 2.7:2 to 4.0:2, a ratio of atoms of said group to atoms of strontium in said phosphor of from 1:1.5 to 1:16, a ratio of atoms of copper to atoms of phosphorus in said phosphor of from 0.001:2 to 0.062:2, and a ratio of atoms of total metal to atoms of phosphorus in said phosphor less than about 3.4:2 when the ratio of total atoms of said group to atoms of strontium in said phosphor is less than about 1:3.

2. A phosphate phosphor having as essential metallic elements strontium, copper at least a portion of which is in the cuprous state, and at least one of the group consisting of aluminum, gallium and indium, a ratio of atoms of total metal to atoms of phosphorus in said phosphor of from 2.9:2 to 3.3:2, a ratio of atoms of said group to atoms of strontium in said phosphor of from 1:3 to 1:8, and a ratio of atoms of copper to atoms of phosphorus in said phosphor of from 0.004:2 to 0.04:2.

3. A phosphate phosphor having metallic elements consisting essentially of strontium, copper at least a portion of which is in the cuprous state, and at least one of the group consisting of aluminum, gallium and indium, a ratio of atoms of total metal to atoms of phosphorus in said phosphor of about 3.1:2, a ratio of atoms of said group to atoms of strontium in said phosphor of about 1:5.5, and a ratio of atoms of copper to atoms of phosphorus in said phosphor of about 0.015:2.

4. A phosphate phosphor having as essential metallic elements strontium, copper, and at least one of the group consisting of aluminum, gallium and indium, a ratio of atoms of total metal to atoms of phosphorus in said phosphor of from 2.7:2 to 4.0:2, a ratio of atoms of said group to atoms of strontium in said phosphor of from 1:1.5 to 1:16, a ratio of atoms of copper to atoms of phosphorus in said phosphor of from 0.001:2 to 0.06:2, a ratio of atoms of total metal to atoms of phosphorus in said phosphor less than about 3.4:2 when the ratio of total atoms of said group to atoms of strontium in said phosphor is less than about 1:3, and said phosphor having been fired during preparation in atmosphere which is at most mildly re- 5. A phosphate phosphor having as essential metallic elements strontium, copper, and at least one of the group consisting of aluminum, gallium and indium, a ratio of atoms of total means to atoms of phosphorus in said phosphor of from 2.7:2 to 4.0:2, a ratio of atoms of said group to atoms of strontium in said phosphor of from 1:1.5 to 1:16, a ratio of atoms of copper to atoms of phosphorus in said phosphor of from 0.001:2 to 0.06:2, a ratio of atoms of total metal to atoms of phosphorus in said phosphor less than about 3.4:2 when the ratio of total atoms of said group to atoms of strontium in said phosphor is less than about 1:3, and said phosphor having been fired during preparation in a slightly-reducing and slightly-moist atmosphere.

6. A phosphate phosphor having metallic elements consisting essentially of strontium, copper at least a part of which is in the cuprous state, and at least one of the group consisting of aluminum, gallium and indium, a ratio of atoms of total metal to atoms of phosphorus in said phosphor of from 2.7:2 to 4.0:2, a ratio of atoms of said group to atoms of strontium in said phosphor of from 1:1.5 to 1:16, a ratio of atoms of copper to atoms of phosphorus in said phosphor of from 0.001:2 to 0.06:2, a ratio of atoms of total metal to atoms of phosphorus in said phosphor less than about 3.4:2 when the ratio of total atoms of said group to atoms of strontium in said phosphor is less than about 1:3, and said phosphor also including additional activator of at least one of the group consisting of manganese and tin in such amount that the ratio of total atoms of such additional activator to atoms of phosphorus in said phosphor is from 0.001:2 to 0.2:2.

7. A phosphate phosphor having as essential metallic elements strontium, copper at least a portion of which is in the cuprous state, and aluminum, a ratio of atoms of total metal to atoms of phosphorus in said phosphor of from 2.7:2 to 4.0:2, a ratio of atoms of aluminum to atoms of strontium in said phosphor of from 1:1.5 to 1:16, a ratio of atoms of copper to atoms of phosphorus in said phosphor of from 0.001:2 to 0.06:2, and a ratio of atoms of total metal to atoms of phosphorus in said phosphor less than about 3.4:2 when the ratio of atoms of aluminum to atoms of strontium in said phosphor is less than about 1:3.

8. A phosphate phosphor having metallic elements consisting essentially of strontium, copper at least a portion of which is in the cuprous state, and aluminum, a ratio of atoms of total metal atoms of phosphorus in said phosphor of from 2.9:2 to 3.3:2, a ratio of atoms of aluminum to atoms of strontium in said phosphor of from 1:3 to 1:8, and a ratio of atoms of copper to atoms of phosphorus in said phosphor of from 0.004:2 to 0.04:2.

9. A cuprous-copper-activated phosphate phosphor having matrix metallic elements consisting essentially of strontium and aluminum, a ratio of atoms of total metal to atoms of phosphorus in said phosphor of about 3.1:2, a ratio of atoms of aluminum to atoms of strontium in said phosphor of about 1:5.5, and a ratio of atoms of copper to atoms of phosphorus in said pohsphor of about 0.015:2.

10. The method of improving the response of phosphate phosphor having as essential metallic elements strontium, copper at least a portion of which is in the cuprous state, and at least one of the group consisting of aluminum, gallium and indium, and wherein the ratio of atoms of total metal to atoms of phosphorus in said phosphor is from 2.7:2 to 4.0:2, the ratio of atoms of said group to atoms of strontium in said phosphor is from 1:1.5 to 1:16, the ratio of atoms of copper to atoms of phosphorus in said phosphor is from 0.001:2 to 0.06:2, and the ratio of atoms of total metal to atoms of phosphorus in said phosphor is less than about 3.4:2 when the ratio of total atoms of said group to atoms of strontium in said phosphor is less than about 1:3, which method comprises washing said phosphor in an ammonium chloride solution, and thereafter rinsing said washed phosphor substantially to remove therefrom residual ammonium chloride.

11. The combination which comprises: a power-operable high-pressure mercury-vapor source having the characteristic of emitting both ultraviolet radiations and visible radiations normally deficient in blue-green and red radiations; a light-transmitting envelope surrounding said source; a composite phosphor coating carried on the interior surface of said light-transmitting envelope; said composite phosphor comprising at least 10% by weight of a red-emitting phosphor and at least 30% by weight of a blue- and green-emitting phosphate phosphor; said red-emitting phosphor consisting essentially of manganese-activated magnesium fluorogermanate; and said blue- and green-emitting phosphate phosphor having metallic elements consisting essentially of strontium, cuprous copper activator and aluminum, a ratio of atoms of total metal to atoms of phosphorus in said phosphor of from 2.7:2 to 4.0:2, a ratio of atoms of aluminum to atoms of strontium in said phosphor of from 1:1.5 to 1:16, a ratio of attoms of copper to atoms of phosphorus in said phosphor of from 0.001:2 to 0.06:2, and a ratio of atoms of total metal to atoms of phosphorus in said phosphor less than about 3.4:2 when the ratio of atoms of aluminum to atoms of strontium in said phosphor is less than about 1:3.

12. A phosphate phosphor having as essential metallic elements strontium, copper at least a portion of which is in the cuprous state, and one of the group consisting of calcium and magnesium, a ratio of atoms of total metal to atoms of phosphorus in said phosphor of from 2.2:2 to 3.1:2, a ratio of atoms of copper to atoms of phosphorus in said phosphor of from 0.001:2 to 0.06:2, a ratio of atoms of magnesium to atoms of strontium in said phosphor of from 1:3 to 1:125, and a ratio of atoms of calcium to atoms of strontium in said phosphor of from 1:1.5 to 1:32.

13. A phosphate phosphor having metallic elements consisting essentially of strontium, copper, at least a portion of which is in the cuprous state, and one of the group consisting of calcium and magnesium, a ratio of atoms of total metal to atoms of phosphorus in said phosphor of from 2.3:2 to 3.05:2, a ratio of atoms of copper to atoms of phosphorus in said phosphor of from 0.004:2 to 0.04:2, a ratio of atoms of magnesium to atoms of strontium in said phosphor of from 1:6 to 1:60, and a a ratio of atoms of calcium to atoms of strontium in said phosphor of from 1:3 to 1:20.

14. A phosphate phosphor having metallic elements consisting essentially of strontium, copper at least a portion of which is in the cuprous state, and one of the group consisting of calcium and magnesium, a ratio of atoms of total metal to atoms of phosphorus in said phosphor of about 2.7:2, a ratio of atoms of copper to atoms of phosphorus in said phosphor of about 0.015:2, a ratio of atoms of magnesium to atoms of strontium in said phosphor of about 1:13, and a ratio of atoms of calcium to atoms of strontium in said phosphor of about 1:8.

15. A phosphate phosphor having as essential metallic elements strontium, copper and one of the group consisting of calcium and magnesium, a ratio of atoms of total metal to atoms of phosphorus in said phosphor of from 2.2:2 to 3.1:2, a ratio of atoms of copper to atoms of phosphorus in said phosphor of from 0.001:2 to 0.06:2, a ratio of atoms of magnesium to atoms of strontium in said phosphor of from 1:3 to 1:125, a ratio of atoms of calcium to atoms of strontium in said phosphor of from 1:1.5 to 1:32, and said phosphor having been fired during preparation in an atmosphere which is at most mildly reactive.

16. A copper activated phosphate phosphor having matrix metallic elements consisting essentially of strontium and one of the group consisting of calcium and magnesium, a ratio of atoms of total metal to atoms of phosphorus in said phosphor of from 2.2:2 to 3.1:2, a ratio of atoms of copper to atoms of phosphorus in said phosphor of from 0.001:2 to 0.06:2, a ratio of atoms of magnesium to atoms of strontium in said phosphor of from 1:3 to 1:125, a ratio of atoms of calcium to atoms of strontium in said phosphor of from 1:1.5 to 1:32, and said phosphor having been fired during preparation in a slightly-reducing and slightly-moist atmosphere.

17. A phosphate phosphor having as essential metallic elements strontium, copper at least a portion of which is in the cuprous state, and calcium, a ratio of atoms of total metal to atoms of phosphorus in said phosphor of from 2.2:2 to 3.1:2, a ratio of atoms of copper to atoms of phosphorus in said phosphor of from 0.001:2 to 0.06:2, and a ratio of atoms of calcium to atoms of strontium in said phosphor of from 1:1.5 to 1:32.

18. A phosphate phosphor having metallic elements consisting essentially of strontium, copper at least a portion of which is in the cuprous state, and calcium, a ratio of atoms of total metal to atoms of phosphorus in said phosphor of from 2.3:2 to 3.05:2, a ratio of atoms of copper to atoms of phosphorus in said phosphor of from 0.004:2 to 0.04:2, and a ratio of atoms of calcium to atoms of strontium in said phosphor of from 1:3 to 1:20.

19. The method of improving the response of phosphate phosphor having as essential metallic elements strontium, cuprous copper activator and one of the group consisting of calcium and magnesium, and wherein the ratio of atoms of total metal to atoms of phosphorus in said phosphor is from 2.2:2 to 3.1:2, the ratio of atoms of copper to atoms of phosphorus in said phosphor is from 0.001:2 to 0.06:2, the ratio of atoms of magnesium to atoms of strontium in said phosphor is from 1:3 to 1:125, and the ratio of atoms of calcium to atoms of strontium in said phosphor is from 1:1.5 to 1:32, which method comprises washing said phosphor in an ammonium chloride solution, and thereafter rinsing said washed phosphor substantially to remove therefrom residual ammonium chloride.

20. A phosphate phosphor having as essential metallic elements strontium, cuprous copper activator and one of the group consisting of calcium and magnesium, a ratio of atoms of total metal to atoms of phosphorus in said phosphor of from 2.2:2 to 3.1:2, a ratio of atoms of copper to atoms of phosphorus in said phosphor of from 0.001:2 to 0.06:2, a ratio of atoms of magnesium to atoms of strontium in said phosphor of from 1:3 to 1:125, a ratio of atoms of calcium to atoms of strontium in said phosphor of from 1:1.5 to 1:32, and said phosphor also including additional activator of at least one of the group consisting of manganese and tin in such amount that the ratio of total atoms of such additional activator to atoms of phosphorus in said phosphor is from 0.001:2 to 0.2:2.

21. The combination which comprises: a power-operable high-pressure mercury-vapor source having the characteristic of emitting both ultraviolet radiations and visible radiations normally deficient in blue-green and red radiations; a light-transmitting envelope surrounding said source; a composite phosphor coating carried on the interior surface of said light-transmitting envelope; said composite phosphor comprising at least 10% by weight of a red-emitting phosphor and at least 30% by weight of blue- and green-emitting phosphor; said red-emitting phosphor consisting essentially of manganese-activated magnesium fluorogermanate; and said blue- and green-emitting phosphor comprising a blend of a first phosphate phosphor and a second phosphate phosphor; said first phosphate phosphor having as essential metallic elements strontium, cuprous copper activator and aluminum, a ratio of atoms of total metal to atoms of phosphorus in said first phosphor of from 2.7:2 to 4.0:2, a ratio of atoms of aluminum to atoms of strontium in said first phosphor of from 1:1.5 to 1:16, a ratio of atoms of copper to atoms of phosphorus in said first phosphor of from 0.001:2 to 0.06:2, and a ratio of atoms of total metal to atoms of phosphorus in said first phosphor less than about 3.4:2 when the ratio of atoms of aluminum to atoms of strontium in said first phosphor is less than about 1:3; said second phosphate phosphor including as metallic elements strontium, copper activator and calcium, a ratio of atoms of total metal to atoms of phosphorus in said second phosphor of from 2.2:2 to 3.1:2, a ratio of atoms of copper to atoms of phorphrus in said second phosphor of from 0.001:2 to 0.06:2, and a ratio of atoms of calcium to atoms of strontium in said second phosphor of from 1:1.5 to 1:32.

22. A copper and manganese activated strontium phosphate phosphor corresponding to the formula $$SrO \cdot (MeO) \cdot P_2O_5 \cdot Cu_2O \cdot MnO$$

wherein (MeO) represents an oxide of at least one metal selected from the group consisting of aluminum and magnesium and wherein the molar ratio of atoms of total metal to atoms of phosphorus in said phosphor is from about 2.7:2 to 3.0:2, the ratio of atoms of said group to atoms of strontium in said phosphor is from about 1:1.5 to 1:16, the ratio of atoms of copper to atoms of phosphorus in said phosphor is from about 0.001:2 to 0.06:2, the molar ratio of manganese to phosphorus is from about 0:2 to 0.20:2, and said phosphor having been fired during preparation in a slightly-reducing atmosphere.

References Cited

UNITED STATES PATENTS

| | | | |
|---|---|---|---|
| 2,579,900 | 12/1951 | Butler | 252—301.4 |
| 2,664,401 | 12/1953 | McKeag et al. | 252—301.4 |
| 2,668,252 | 2/1954 | Ouweltjes | 313—25 |
| 2,750,344 | 6/1956 | Kroger et al. | 252—301.4 |
| 2,755,254 | 7/1956 | Butler | 252—301.4 |
| 2,758,095 | 8/1956 | Wollentin et al. | 252—301.6 |
| 2,772,241 | 11/1956 | Ramby | 252—301.4 |
| 2,806,968 | 9/1957 | Thorington et al. | 313—25 |
| 2,838,715 | 6/1958 | Payne | 252—301.6 |
| 2,898,302 | 8/1959 | Butler | 252—301.4 |
| 2,919,365 | 12/1959 | Butler et al. | 252—301.4 |
| 3,143,510 | 8/1964 | Wanmaker et al. | 252—301.6 |

FOREIGN PATENTS

| | | |
|---|---|---|
| 32-1811 | 3/1957 | Japan. |
| 32-1812 | 3/1957 | Japan. |

OTHER REFERENCES

Pascal, Nouveau Traité de Chimie Minerale, Tome VIII, 1963, pp. 334–335.

Pascal, Nouveau Traité de Chimie Minerale, Tome III, 1957, pp. 216–217.

TOBIAS E. LEVOW, *Primary Examiner.*

RALPH NEILSON, JOSEPH R. LIBERMAN, JULIUS GREENWALD, *Examiners.*

C. R. CAMPBELL, R.D. EDMONDS,
*Assistant Examiners.*